Aug. 10, 1943.    E. S. LARSON ET AL    2,326,148
SENSING APPARATUS
Filed March 3, 1941

INVENTOR
EDWARD S. LARSON
EDWIN J. SKEPPSTROM

J.H.B. Whitfield
ATTORNEY

Patented Aug. 10, 1943

2,326,148

UNITED STATES PATENT OFFICE 2,326,148

SENSING APPARATUS

Edward S. Larson, Chicago, and Edwin J. Skeppstrom, Park Ridge, Ill., assignors to Teletype Corporation, Chicago, Ill., a corporation of Delaware Application March 3, 1941, Serial No. 381,416

11 Claims. (Cl. 178—17)

The present invention relates to telegraph transmission apparatus and particularly to tape sensing mechanisms therefor.

In automatic telegraphy, tape controlled telegraph transmitting devices are employed in which code combinations of perforations are installed transversely and successively on a continuous tape or form. A set of sensing elements senses the transverse areas of said tape to determine the presence or absence of a perforation in each position in the tape and in accordance with the finding of each sensing element of perforations an associated contact is conditioned thereby preparing for the generation of a code combination signal having the permutation characteristics of the perforations in said tape.

Under the practice of form preparation taught in U. S. copending application Serial No. 274,811 filed May 20, 1939, the installation of code markings in a control form consists in incising of the tape with small part-circular incisions so as to leave attached to the main body of the tape those portions which, in accordance with a previous practice, had been severed completely. Thus, effectively there is maintained whole the entire surface area of the tape. This manner of tape preparation has been developed for the purpose of affording surface printing areas on the tape to carry information collateral to that conveyed by the code perforations.

Accordingly, a principal object of the present invention is an apparatus for sensing lidded aperture control forms under conditions of high speed telegraph transmission without incurring interference by the aperture lids with mechanism which is active in the sensing or advancement of the control forms.

In order to avoid interference between lidded aperture tape and conventional sensing mechanism, such as is utilized in connection with automatic telegraph transmitters and to accomplish the object of invention, it is proposed to provide a hold-down member or backing device which will not interfere with the attached lids of control forms prepared in accordance with the above-mentioned copending application. This improvement is obtained by the provision of a tape backing plate having continuous elongated slots that extend throughout the entire length of that portion of the backing plate which serves as a pressure member for holding the form against the upper surface of the tape sensing table, so that intervening adjacent areas wherein the tape lids occur there will be presented hold-down formations which extend longitudinally the full length of the backing area but which afford no transverse interference with the passage of the tape or form lids. Since these lids are moved upwardly by the action of the sensing fingers, they may or may not return to the original condition after the form has passed beyond the immediate region of the tape sensing operation.

For a more comprehensive understanding of the present invention, reference may be had to the following detailed specification and to the accompanying drawing in which similar reference characters designate corresponding parts throughout and in which.

Figure 1:
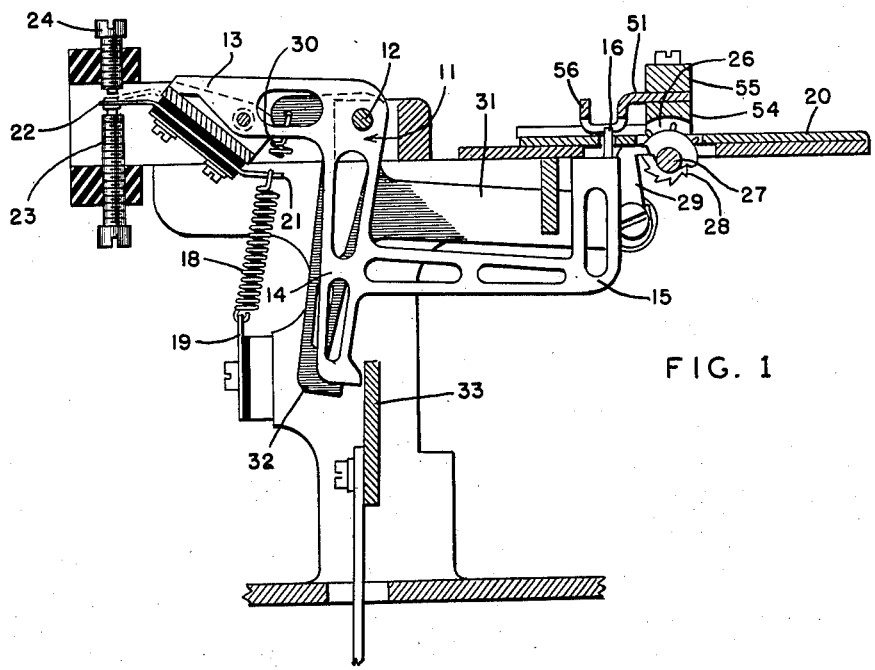
Fig. 1 is a transverse sectional view through a typical tape sensing apparatus having applied thereto a preferred embodiment of the present invention.
Figure 4:
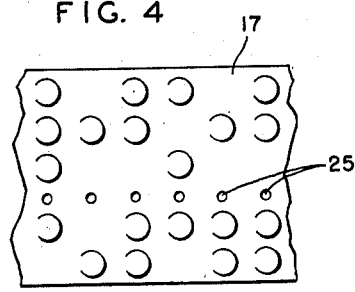
Figure 3:
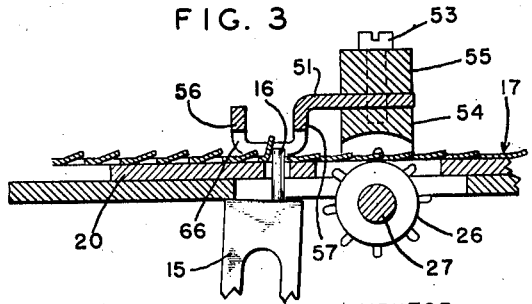

Fig. 3 is an enlarged detailed view similar to that shown in Fig. 1 illustrating effectively a condition of operation when lidded aperture tape is used in connection with the preferred embodiment of Fig. 1; and Fig. 4 is a fragmentary plan view of a section of tape or control form prepared in accordance with a signal component incising method which leaves attached to the main body of the form semicircular lids, flaps, or tongues that may be deflected when encountered by the probing pins of a sensing apparatus.

Referring now more particularly to the accompanying drawing, the reference character 11 designates one of a set of similarly profiled feeler levers which are pivoted on a common shaft 12 and which in the instant illustration are comprised of three principal arm extensions designated 13, 14 and 15. Extending upwardly from the end of the several feeler lever arms 15 are a set of feeler or probing pins 16 of small diameter so that they may easily be received within the openings of a control form 17 after the manner illustrated in Fig. 3.

Each feeler lever 11 is urged in a counterclockwise direction about the common pivot shaft 12 through the influence of an individually associated spring 18. One end of each spring 18 is anchored to a tie plate 19 while its upper end is secured to an individual ear 21 carried upon the arm 13 of each sensing lever 11. Also carried by each one of said arms 13 is a contactor 22 which is capable of engaging one or the other of a pair of contact screws 23 or 24 which are respectively connected to various sources of current supply such as positive and negative, current and no-current, etc., as the case may be.

The several contactors 22 are connected to the segments of a transmitting distributor and as the several feeler levers 11 are permitted to rotate in a counterclockwise direction under the influence of their individual springs 18, those of them whose sensing pins 16 encounter lidded apertures in the tape 17 are unobstructed and permitted to rotate in a counterclockwise direction to an extent that their associated contactors 22 will be enabled to engage the lowermost contact screws 23 obtaining corresponding current characteristic to associate with their respective transmitting distributor segments while, on the other hand, those of the feeler levers 11 whose sensing pins 16 do not encounter the described lidded perforations but instead only imperforated areas in the tape 17 are not permitted to rotate in a counterclockwise direction to this extent since their sensing pins 16 are thereby obstructed causing their associated contactors 22 to remain in engagement with the uppermost ones of the contact screws indicated 24 supplying to their respective distributor segments current potential of the type associated with said screws 24.

As may be observed from Fig. 4, the code combination associated with each signal is arranged in a transverse alignment upon the tape 17. During each cyclic operation of the apparatus illustrated in Fig. 1, the several sensing levers 11 are permitted to come into engagement with the tape as described and following each such cyclic operation, the tape 17 is advanced a distance corresponding to the linear distance between two transverse code combinations of the tape, Fig. 4. The tape 17 is fed leftwardly as viewed in Figs. 1 and 3 through the engagement with a row of feed perforations 25 of a sprocket wheel 26 having appropriately spaced pin teeth and carried upon a sprocket feed shaft 27 which is rotated in a counterclockwise direction in step-by-step manner when the detented ratchet wheel 28 integrally associated therewith has its teeth successively engaged by the reciprocating pawl 29. In moving across the tape sensing area of the apparatus, the tape 17 is supported upon a plane surfaced platform 29 which may be augmented by confinement guides, etc, (not shown) to direct the course of the tape, and which is suitably cut out to admit protrusion of said sprocket wheel 26 as well as the probing pins 16.

Feed pawl 29 is carried upon one arm 31 of a lever pivoted on shaft 12 and urged in a counterclockwise direction by an operating spring 39 as are the set of feeler levers 11 by their individual springs 18. Also pawl 29 has a downwardly extending arm 32 which is engaged by the common return bail 33 when the latter member is cyclically moved towards the left but shortly after it has engaged the extremities of arm 14. As may be noticed from a comparison of the projecting extremity of arm 32 and those of arms 14 of the sensing levers, the latter extend, before engagement by bail blade 33, somewhat farther toward the right than does the former. Thereby is assured that the sensing pins 16 are withdrawn from the tape 17 before the shaft 27 is rotated to advance the tape 17 in a leftward direction across the platform 29. The reciprocation of common return bail 33 is cyclically executed either through the actuation of an operating solenoid or through the operation of a rotary cam device, both practices being well-known to those acquainted in printing telegraphy.

Incision marked tapes 17 is prepared in an apparatus such as that illustrated in the above-mentioned copending U. S. application Serial No. 274,811 and in its preparation the feed holes 25 are preferably fully perforated as illustrated in Fig. 4 but the holes representing the marking indices of the perforated code combination are made by producing approximately part-circular cuts in the region of each marking index by means of a cutting or punching tool especially designed to produce this result, then permitting the partially severed or lid portion to resume its original position and remain attached to the body of the tape by means of that narrow tongue by which the incision falls short of being a complete circular cut.

For purposes of sensing the prepared forms as by means of apparatus illustrated in Figs. 1 and 3 the presence of the lids, tabs, or flaps constitutes no interference. Certain advantages obtained in the improved manner of control form preparation are enumerated in the above-mentioned copending application and these more than offset the slight inconvenience in feeding or threading the control form through the tape advancing auxiliary apparatus. Such interference may be found as for example in the slight frictional conflict between the tabs or flaps and a hold-down plate which is provided above the sensing fingers to cooperate with the latter by bracing the adjacent areas of the form.

Under known practice, hold-down plates are provided with circular holes somewhat larger in diameter than are the probing pins and overlying the proximity of each one of the said pins 16 in order that the surrounding metal portion of the plate may constitute a backing or support to the tape to prevent the tape from becoming torn, frayed, or from yielding due to the pressure of the sensing pins 16 when such yielding is not intended as in the case of no perforation in any position. The provision of backing support throughout the entire width of the tape 17 is recognized as necessary to the proper function of tape sensing. However, with the practice of preparing control forms having attached to the main body of the tape the tabs or flaps, as indicated in Figs. 3 and 4, it becomes necessary to provide greater clearance in the backing plate in order that the tabs or flaps may be permitted to rise when deflected by a sensing pin 16, such as the one illustrated in Fig. 3, and since any lid or flap thus displaced by a sensing pin may, due to the characteristics of the material from which the form 17 is prepared, fail to resume its original condition, ample clearance must be provided in hold-down elements or fixtures to permit said flaps or tabs which may not return to their prone position, sufficient clearance to avoid interference and the consequent possibility of jamming or tearing of the tape.

Figure 2:
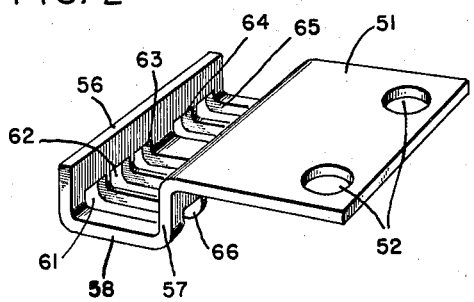
Fig. 2 is a perspective detailed view of an improved hold-down plate such as may be used in practicing the present invention.

Accordingly, the hold-down plate 51, Fig. 2, is made of a relatively rigid rectangular plate having the securement holes 52 through which pass the binding screws 53 for anchoring said plate 51 between the supporting block 54 and the bracing block 55 of the assembly, Fig. 3. Plate 51 extends horizontally a short distance in a leftward direction as view in Figs. 1 and 3 and is then bent sharply downward, again sharply leftward, then back upward with a trailing wall 56. The foremost wall 57 is parallel with the trailing wall 56, and extending longitudinally of the connecting wall 58 between the two upright walls, there are milled out certain sections overlying associated ones of the feeler lever arms 15 and their integrally formed sensing pins 16. The milled out sections associated with the several feeler pins are indicated individually in Fig. 2 by the reference characters 61, 62, 63, 64 and 65. These channeled passageways extend throughout the lengths of the bottom-wall 58 and also partway up the two upright walls 56 and 57 as may be seen in Fig. 3.

By providing ample clearance in said milled-out sections throughout the length of the hold-down plate 51 over the proximity that may be traversed by each one of the tabs or flaps of the tape, it is rendered practically impossible for the body of any one of the tabs to encounter the metallic parts of the hold-down plate 51. Each one of the longitudinal passageway spaces 61 to 65 is of such width as to marginally clear the width of the tabs of form 17. Yet some metal intervenes between each one of the clearances 61 to 65 in the form of thin wall partitions such as indicated 66 serving the purpose of backing those areas of the control form 17 which intervene adjacent code marking positions.

While the present invention has been explained and described with reference to a specifically contemplated embodiment, it is to be understood that numerous modifications and variations may be incorporated without departing from the spirit or scope thereof. Accordingly, it is not intended to be limited by the particulars of the foregoing detailed specification nor by the specific illustrations in the accompanying drawing except as indicated in the hereunto appended claims.

What is claimed is:

1. In a form sensing apparatus, an intermittent motion means, a set of tape sensing levers spring impelled toward the surface of a control form and withdrawn by said means, a form advancing mechanism cyclically actuated by said means, and a hold-down plate for backing said form in the proximity of engagement with said set of tape sensing levers comprising an element having extending channels longitudinally of said form.

2. In combination with a set of feeler levers comprising a plurality of parallelly arranged pivoted elements, a probing pin associated with each one of said elements, a form supporting platform, said probing pins being in transverse alignment with an area of said platform, means for advancing a control form over said area so as to present successively transverse portions of said form for alignment with said probing pins, and a backing member for supporting said forms adjacent said area comprising a metal element bent to form a backing wall and provided thereat with grooves longitudinal of the form for passing therethrough portions of said form raised by said probing pins.

3. In combination with an apparatus for sensing and advancing a longitudinal form having semicircular incisions so as to afford trailing flap formations, a backing member comprising a sheet metal element coextensive with the width of said form and bent to provide a channel wall reinforcement, said channel wall having grooves in a direction parallel to the movement of said form, said grooves being of width to encompass and align longitudinally with said flap formation of said form.

4. In combination, an apparatus for sensing and advancing a longitudinal form having flap formations, a backing member comprising a sheet metal element coextensive with the width of said form, said member providing longitudinal grooves in a direction parallel to the movement of said form, said grooves being arranged to align with said flap formations, said member providing intermediate said grooves narrow wall sections to afford backing to said form between said flap formations.

5. In a form sensing apparatus, a set of tape sensing elements individually impelled toward a central form, a form advancing mechanism, means to cyclically actuate said mechanism, and a hold-down plate for backing said form in the proximity of engagement with said set of sensing elements comprising a channel member presented across said form having grooves parallel to the direction of movement of said form.

6. In combination, a set of pivoted feeler levers parallelly arranged and having associated probing pins, said pins being in transverse alignment within a predetermined probing area, means for advancing a control form across said probing area so as to present successively transverse portions of said form for probing, and a backing member for supporting said form adjacent said probing area comprising a metal element providing a transverse channel having longitudinal grooves for receiving flap portions of said form deflected by said probing pins.

7. In combination, an apparatus for sensing and advancing a strip having lidded apertures, a backing member comprising an element extending across the width of said strip, said element providing longitudinal grooves in a direction parallel to the movement of said strip, said grooves being arranged to align with said lidded apertures, said element providing intermediate said grooves rib sections to afford backing to said strip between said lidded apertures.

8. In a tape supporting means for automatic signaling apparatus, a plate member positioned adjacent the surface of the tape and having a plurality of open-ended slots therein, said slots being substantially parallel to the direction of travel of the tape and located in the forward part of said plate with respect to said direction of travel.

9. In a tape feeding mechanism, a plate member having a plurality of spaced bar members associated with the forward part thereof for supporting the tape during the feeding operation, said bar members being positioned adjacent the surface of the tape and substantially parallel to the direction of travel thereof.

10. In a tape feeding mechanism, a plurality of bar members positioned adjacent the surface of the tape for supporting said tape during the feeding operation, said bar members being substantially parallel to the direction of travel of the tape and spaced apart with respect to each other.

11. In a tape supporting means for printing telegraph apparatus, a plate member having its rear edge rounded off at the point of entrance of the tape and having a plurality of bars associated with the forward part thereof, said bars being substantially parallel to the direction of travel of the tape and spaced apart with respect to each other.

EDWARD S. LARSON.
EDWIN J. SKEPPSTROM.